United States Patent
Zhang et al.

(10) Patent No.: US 12,299,329 B2
(45) Date of Patent: May 13, 2025

(54) MEMORY MODULE, COMPUTER, AND SERVER

(71) Applicant: ZHEJIANG SHAOXING QINGYI INFORMATION TECHNOLOGY CO., LTD., Zhejiang (CN)

(72) Inventors: Xia Zhang, Zhejiang (CN); Xiaogang Zheng, Zhejiang (CN)

(73) Assignee: ZHEJIANG SHAOXING QINGYI INFORMATION TECHNOLOGY CO., LTD., Zhejiang (CN)

( * ) Notice: Subject to any disclaimer, the term of this patent is extended or adjusted under 35 U.S.C. 154(b) by 65 days.

(21) Appl. No.: 17/978,940

(22) Filed: Nov. 1, 2022

(65) Prior Publication Data

US 2023/0050592 A1 Feb. 16, 2023

Related U.S. Application Data

(63) Continuation of application No. PCT/CN2021/100280, filed on Jun. 16, 2021.

(30) Foreign Application Priority Data

Jun. 19, 2020 (CN) .......................... 202010566027.2

(51) Int. Cl.
*G06F 3/06* (2006.01)
(52) U.S. Cl.
CPC .......... *G06F 3/0659* (2013.01); *G06F 3/0619* (2013.01); *G06F 3/0679* (2013.01)
(58) Field of Classification Search
CPC .... G06F 3/0659; G06F 3/0619; G06F 3/0679; G06F 3/061; G06F 3/0655; G06F 3/0604;
(Continued)

(56) References Cited

U.S. PATENT DOCUMENTS 9,817,610 B1 11/2017 Shallal et al.
2010/0008175 A1* 1/2010 Sweere ................ G11C 11/005
365/228

(Continued)

FOREIGN PATENT DOCUMENTS

CN 101082891 12/2007
CN 102841820 12/2012

(Continued)

OTHER PUBLICATIONS

Cun Chu Ji Ke, "No worry about data loss in case of power interruption, you can directly cut off and shut down your computer with this memory?," with English translation thereof, Aug. 21, 2018, pp. 1-8. Available at: https://www.sohu.com/a/249188623_615464.

(Continued)

*Primary Examiner* — Curtis James Kortman

(57) ABSTRACT

A memory module is provided. The memory module includes: a control chip, at least one data flash memory chip, at least two memory cells, and at least one non-volatile memory, each of the at least one data flash memory chip is connected to at least one of the at least two memory cells and at least one of the at least one non-volatile memory, the control chip is connected to the at least one data flash memory chip and the at least two memory cells, and the memory is further connected to at least one capacitor; the control chip is configured to send a control command; and each of the at least one data flash memory chip is configured to perform, based on the control command from the control chip, data processing between the memory cell connected thereto and the non-volatile memory connected thereto.

20 Claims, 4 Drawing Sheets

(58) Field of Classification Search
CPC .... G06F 3/0629; G06F 3/0671; G06F 3/0685; G06F 3/065; G06F 3/0647; G06F 11/1479; G06F 11/1441; G06F 12/0246; G06F 13/1694; G06F 13/28; G06F 2212/205; G06F 1/30; Y02D 10/00
See application file for complete search history.

(56) References Cited

U.S. PATENT DOCUMENTS

| | | | |
|---|---|---|---|
| 2010/0042907 A1* | 2/2010 | Pilsl | H03M 13/153 714/E11.032 |
| 2010/0080057 A1* | 4/2010 | Reuter | G11C 5/141 365/185.04 |
| 2010/0205348 A1 | 8/2010 | Moshayedi et al. | |
| 2016/0267007 A1* | 9/2016 | Zheng | G06F 11/1441 |
| 2017/0160956 A1* | 6/2017 | Chinnakkonda Vidyapoornachary | G06F 3/0688 |
| 2018/0059993 A1* | 3/2018 | Lee | G06F 12/0246 |
| 2018/0089079 A1* | 3/2018 | Hansson | G06F 13/4234 |
| 2019/0026238 A1* | 1/2019 | Lendvay | G11C 11/4093 |
| 2019/0286560 A1* | 9/2019 | Shallal | G06F 12/0802 |
| 2020/0081763 A1* | 3/2020 | Mittal | G06F 11/1048 |
| 2020/0192804 A1* | 6/2020 | Lee | G06F 13/00 |
| 2021/0124701 A1* | 4/2021 | Lee | G06F 13/4243 |

FOREIGN PATENT DOCUMENTS

| | | |
|---|---|---|
| CN | 103500131 | 1/2014 |
| CN | 104021093 | 9/2014 |
| CN | 106569964 | 4/2017 |
| CN | 110727470 | 1/2020 |
| CN | 112000276 | 11/2020 |
| JP | 2000194607 | 7/2000 |

OTHER PUBLICATIONS

"Office Action of China Counterpart Application" with English translation thereof, issued on Jun. 9, 2022, p. 1-p. 11.

"International Search Report (Form PCT/ISA/210) of PCT/CN2021/100280," mailed on Sep. 16, 2021, with English translation thereof, pp. 1-6.

"Written Opinion of the International Searching Authority (Form PCT/ISA/237) of PCT/CN2021/100280," mailed on Sep. 16, 2021, pp. 1-5.

* cited by examiner

MEMORY MODULE, COMPUTER, AND SERVER

CROSS-REFERENCE TO RELATED APPLICATION

This application is a continuation of international PCT Application No. PCT/CN2021/100280, filed on Jun. 16, 2021, which claims the priority benefit of Chinese Patent Application No. 202010566027.2, filed on Jun. 19, 2020. The entirety of each of the above mentioned patent applications is hereby incorporated by reference herein and made a part of this specification.

TECHNICAL FIELD

The present application relates to the technical field of computer storage, and in particular, relates to a memory module, a computer, and a server.

BACKGROUND

A memory module, as a storage for hosting data, is a storage space that is directly addressable and accessible by a central processing unit (CPU), and is manufactured by a semiconductor material.

The memory module is a main component of a computer. Commonly used applications, for example, Windows operating systems, typing software, gaming software, and the like are generally installed on an external storage, for example, a hard disk or the like. However, for implementation of functionality of these applications and software, these applications and software need to be loaded to the memory and run in the memory. For example, usual typing of a text or playing a game is actually done in a memory module. Usually, a large amount of data to be permanently stored is stored on an external memory module, while some temporary or a small amount of data and programs are stored on the memory module. Therefore, the quality of the memory module directly affects a running speed of a computer.

A memory module generally employs semiconductor memory units, including a random-access memory (RAM), a read-only memory (ROM), and a cache (CACHE). The RAM is the most important memory, including: a synchronous dynamic random access memory (SDRAM) and a double data rate (DDR) RAM (DDR RAM).

A non-volatile dual in-line memory module (NVDIMM) is a type of persistent random-access memory for computers. A non-volatile memory is a memory that retains its connects even when electrical power is removed, for example, from an unexpected power loss, system crash, or normal shutdown. In some cases, NVDIMMs can improve application performance, data security, and system crash recovery time. They enhance solid-state drive (SSD) endurance and reliability.

A NVDIMM-N is a memory module with a DDR4 DRAM and a flash memory on the same module, and in the event of a power failure, the module copies the data from the volatile traditional DRAM to the persistent flash memory.

As illustrated in FIG. 1, a structural diagram of architecture of an NVDIMM-N in the related art is given. A NVDIMM-N 1 is inserted into a memory slot in a server. From the perspective of hardware, the NVDIMM-N 1 is connected to a central processing unit (CPU) 2 and a power source 3 in the server, The NVDIMM-N 1 includes an NVDIMM controller 110, a plurality of dynamic random-access memories (DRAMs) 111, a flash memory 112, and a power adapter 113. The NVDIMM controller 110 is connected to the plurality of DRAMs 111 and the flash memory 112, and the power adapter 113 is connected to the power source in the server. With respect to such NVDIMM-Ns, in the event of an unexpected power outage, the data in the memory may be quickly written to memory cells to reduce the loss caused by data loss. Therefore, such NVDIMM-Ns are particularly suitable for enterprise or users imposing higher requirements on data.

However, due to power failure protection, in the case of a power failure, the data in the DRAM needs to be copied to the flash memory, and the data are copied from the flash memory to the DRAM when the power resumes. In this way, the NVDIMM-N controller and the flash memory cells occupy the space of the DRAM cells. Therefore, the NVDIMM-N may have a small capacity. The RRAM cells only account for approximately half of the area of the entire NVDIMM-N, and thus the NVDIMM-N is subject to an application problem of insufficient capacity.

SUMMARY

Embodiments of the present application provide a memory module, and a computer and a server including the memory module. With the memory module, under a limited space, the capacity may be maximally expanded.

According to a first aspect of the present application, a memory module is provided. The memory module includes: a control chip, at least one data flash memory chip, at least two memory cells, and at least one non-volatile memory, wherein each of the at least one data flash memory chip is connected to at least one of the at least two memory cells and at least one of the at least one non-volatile memory, the control chip is connected to the at least one data flash memory chip and the at least two memory cells, and the memory module is further connected to at least one capacitor; wherein the control chip is configured to send a control command; and each of the at least one data flash memory chip is configured to perform, based on the control command from the control chip, data processing between the memory cell and the non-volatile memory that are connected thereto.

Optionally, the control command includes a data backup command and a data read command; wherein the control chip is configured to send the data backup command to each of the at least one data flash memory chip and send the data read command to each of the at least two memory cells under power supply from the capacitor in response to an unexpected power outage;

each of the at least two memory cells is configured to send data thereon to a data signal line based on the data read command under power supply from the capacitor; and each of the at least one data flash memory chip is configured to acquire, based on the data backup command, the data sent by the memory cell connected thereto from the data signal line and write the data to the at least one non-volatile memory connected thereto under power supply from the capacitor.

Optionally, each of the at least one data flash memory chip is further configured to: before sending the data read command by the control chip, determine whether the non-volatile memory connected thereto is capable of storing data; and send a backup preparation complete message to the control chip in the case that the data flash memory chip determines that the non-volatile memory connected thereto is capable of storing data.

Optionally, the control command includes a data restore command and a data write command; wherein
- the control chip is configured to send the data restore command to each of the at least one data flash memory chip and send the data write command to each of the at least two memory cells in response to a power resumption;
- each of the at least one data flash memory chip is further configured to, in response to the power resumption, read data from the non-volatile memory connected thereto and send the data to a data signal line based on the data restore command; and
- each of the at least two memory cells is configured to acquire data sent by the data flash memory chip connected thereto from the data signal line based on the data write command in response to the power resumption, and write the data to the memory cell.

Optionally, each of the at least one data flash memory chip is further configured to: before sending the data write command by the control chip to each of the at least two memory cells, determine whether the non-volatile memory connected thereto has prepared for data restoration; and send a data restoration preparation complete message to the control chip in that case that the non-volatile memory has prepared for data restoration.

Optionally, the control chip includes at least one control pin, and the memory module further includes at least one multiplexer, wherein the control chip is connected to the at least one multiplexer by the at least one control pin, the at least one multiplexer are connected to the at least two memory cells, and the multiplexer is configured to determine whether a CPU or the control chip is selected to read the memory cells connected to the multiplexer.

Optionally, data of each of the at least two memory cells is stored to a corresponding position in the at least one non-volatile memory; or data of each of the at least two memory cells is stored to a fixed position of a data sequence in the at least one non-volatile memory.

Optionally, the control chip is further configured to determine a flow control rate according to a quantity and performance of the memory cells, and a quantity and processing capabilities of the data flash memory chips.

Optionally, a storage capacity of each of the at least one non-volatile memory is greater than a storage capacity of all the memory cells connected to the data flash memory chip that is connected to the non-volatile memory.

Optionally, the control chip is connected to each of the at least one data flash memory chip by a Serializer/Deserializer (SerDes) bus.

Optionally, the control chip 101 is further configured to receive an unexpected power outage notification from hardware of the CPU, and determine that the unexpected power outage occurs according to the unexpected power outage notification.

Optionally, each of the at least one data flash memory chip is further configured to determine whether the non-volatile memory connected thereto fails, and determine that the non-volatile memory is capable of storing data in the case that the non-volatile memory does not fail; or each of the at least one data flash memory chip is further configured to determine whether a remaining capacity of the non-volatile memory connected thereto is greater than or equal to a predetermined threshold, and determine that the non-volatile memory is capable of storing data in the case that the remaining capacity of the non-volatile memory is greater than the predetermined threshold.

Optionally, the storage capacity of each of the at least one non-volatile memory is 1.5, 2, 3, 4, or 5 times the storage capacity of all the memory cells connected to the data flash memory chip that is connected to the non-volatile memory.

According to a second aspect of the present application, a computer is provided. The computer includes the memory module as described above.

According to a third aspect of the present application, a server is provided. The server includes the memory module as described above.

With respect to the memory module, and the computer and server including the memory module as described above, in the memory module, the data signal and the control signal are separately managed by two chips; the control chip is responsible for outputting the control signal, and the data flash memory chip is responsible for processing data. In this way, the data signals of the non-volatile memory and the memory cell are no longer transmitted over the control chip, which greatly reduces connection lines from the memory cell to the control chip and also reduces the size of the control chip, such that a larger area is provided for the memory cell, dense wiring in the central position is optimized, and a signal transmission speed is also improved.

BRIEF DESCRIPTION OF THE DRAWINGS

For clearer description of the technical solutions according to the embodiments of the present application or in the related art, drawings that are to be referred for description of the embodiments art are briefly described hereinafter. Apparently, the drawings described hereinafter merely illustrate some embodiments of the present application. Persons of ordinary skill in the art may also derive other drawings based on the drawings described herein without any creative effort.

DETAILED DESCRIPTION

For clearer descriptions of the objectives, technical solutions, and advantages of the embodiments of the present application, the following clearly and completely describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The term "and/or" is merely an association relationship for describing associated objects, which represents that there may exist three types of relationships, for example, A and/or B may represent three situations: only A exists, both A and B exist, and only B exists. In addition, the symbol "/" generally represents an "or" relationship between associated objects before and after the character.

Figure 1:
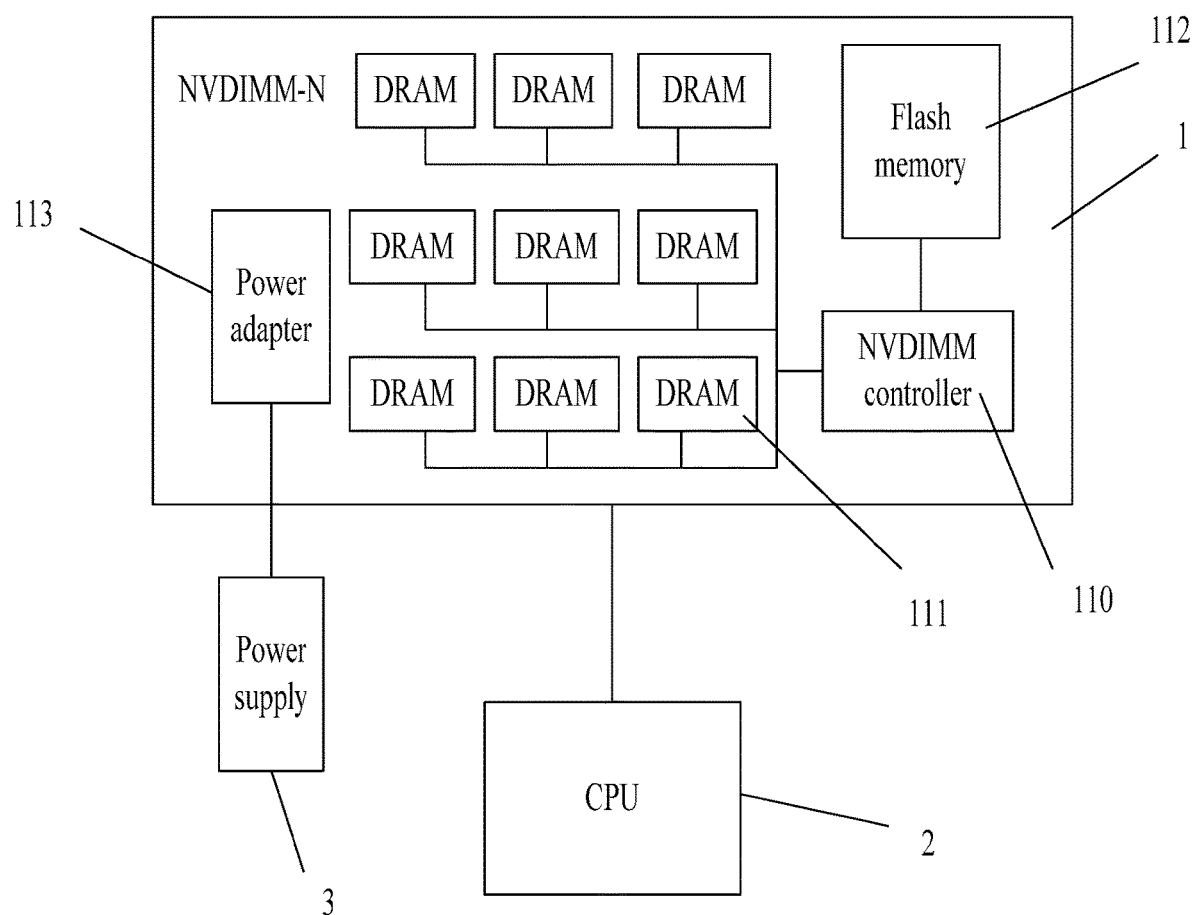
FIG. 1 is a schematic structural diagram of a memory module in the related art.
Figure 2:
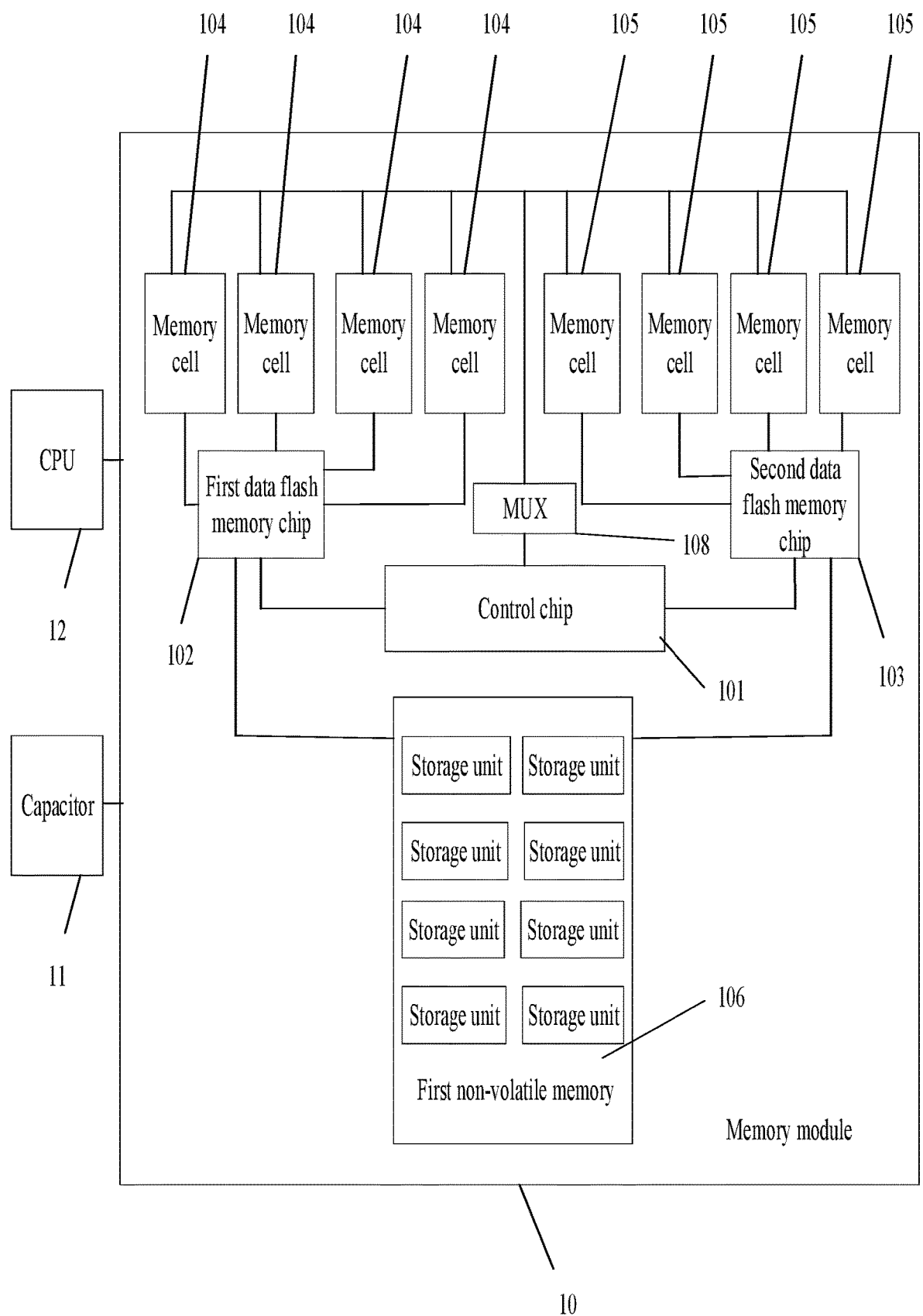
FIG. 2 is a schematic structural diagram of a memory module according to one embodiment of the present application.

As illustrated in FIG. 2, a schematic structural view of a memory module 10 according to an embodiment of the present application is given. The memory module 10 may be applied to various computers or servers, for example, laptop computers or desktop computers. The memory module 10 may be connected to a capacitor 11 and a CPU 12. The capacitor is configured to supply power to the memory module in response to a power outage. For example, in response to an unexpected power outage, the memory module 10 may still operate for a period of time under power supply by the capacitor 11. This period of time is determined depending on a capacity of the capacitor 11. In response to a power resumption, the capacitor 11 may be charged by a power source.

The memory module 10 may be a non-volatile memory (NVDIMM-N).

As illustrated in FIG. 2, the memory module 10 includes: a control chip 101, at least one data flash memory chip, at least two memory cells, and at least one non-volatile memory 106; wherein each of the at least one data flash memory chip is connected to at least one of the at least two memory cells and at least one of the at least one non-volatile memory 106, and the control chip 101 is connected to all the at least one data flash memory chip and all the at least two memory cells. For example, the control chip 101 is connected to the at least two memory cells by a multiplexer (MUX) 108.

The control chip 101 may be referred to as a primary control chip, for example, an NVDIMM control chip. The data flash memory chip may be referred to as a data chip, for example, an NVIDIMM data flash memory chip.

Figure 3:
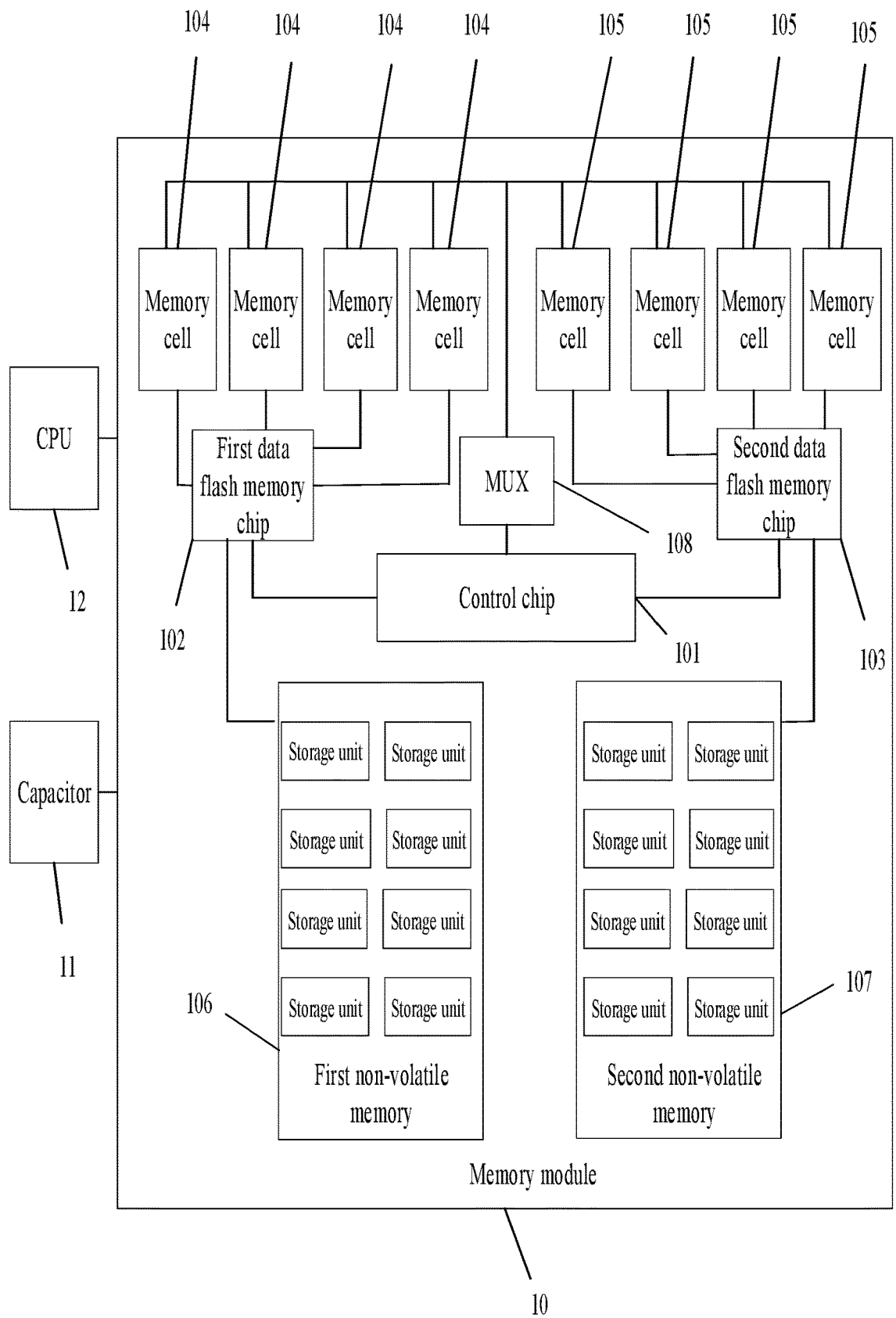
FIG. 3 is a schematic structural diagram of another memory module according to another embodiment of the present application.

For example, as illustrated in FIG. 3, a schematic structural diagram of another memory module according to another embodiment of the present application is given. The at least one data flash memory chip include a first data flash memory chip 102 and a second data flash memory chip 103. The first data flash memory chip 102 is connected to four memory cells 104, and the second data flash memory chip 103 is connected to four memory cells 105.

In another embodiment of the present application, the memory cells 104 and the memory cells 105 may be memory cells or DDR cells or DRAM cells or SDRAM cells, which are not limited in this embodiment.

In another embodiment of the present application, the non-volatile memory 106 may also be referred to as a flash memory, at least one first non-volatile memory 106 may be provided, and each of the at least one data flash memory chip is further connected to at least one of the at least one first non-volatile memory 106. For example, as illustrated in FIG. 3, the first data flash memory chip 102 is connected to at least one first non-volatile memory 106, and the second data flash memory chip 103 is connected to at least one second non-volatile memory 107.

In another embodiment of the present application, each of the at least one non-volatile memory includes non-volatile memory units in a matrix configuration, for example, 2, 4, 8, or n non-volatile memory units, wherein n is a power of 2.

In another embodiment of the present application, a storage capacity of each of the at least one non-volatile memory is greater than a storage capacity of all the memory cells connected to the data flash memory chip that is connected to the non-volatile memory. For example, the storage capacity of each of the at least one non-volatile memory is 1.5, 2, 3, 4, or 5 times the storage capacity of all the memory cells connected to the data flash memory chip that is connected to the non-volatile memory.

For example, in the case that the memory module 10 includes only one non-volatile memory 106, a storage capacity of the first non-volatile memory 106 is greater than a storage capacity of all the memory cells. For example, the storage capacity of the non-volatile memory 106 is 1.5, 2, 3, 4, or 5 times the storage capacity of all the memory cells. In the case that the memory module 10 includes the first non-volatile memory 106 and the second non-volatile memory 107, a storage capacity of the first non-volatile memory 106 is greater than a storage capacity of all the memory cells connected to the first data flash memory chip 102, and a storage capacity of the second non-volatile memory 107 is greater than a storage capacity of all the memory cells connected to the second data flash memory chip 103. For example, each of the storage capacity of the first non-volatile memory 106 and the storage capacity of the second non-volatile memory 107 is 1.5, 2, 3, 4, or 5 times the storage capacity of all the memory cells connected thereto.

In another embodiment of the present application, the control chip 101 is connected to each of the at least one data flash memory chip by a Serializer/Deserializer (SerDes) bus. For example, the control chip 101 is connected to the first data flash ship 102 and the second flash data chips 103 by the SerDes bus.

The control chip 101 is configured to send a control command, for example, sending the control command to each of the at least one data flash memory chip and sending a data processing control command to each of the at least two memory cells. For example, the control command includes a DDR address and/or a clock, and a data backup command or a data restore command; and the data processing control command includes a data read command or a data write command.

The data flash memory chip is configured to perform, based on the control command from the control chip 101, data processing between a memory cell connected thereto and a non-volatile memory connected thereto. For example, in response to an unexpected power outage, the each of the at least one data flash memory chip backs up, based on the data backup command from the control chip 101, data in the memory cell connected thereto to the corresponding non-volatile memory connected thereto to implement data backup; and in response to a power resumption, the data flash memory chip restores, based on the data restore command from the control chip 101, data in the non-volatile memory connected thereto to the corresponding memory cells connected thereto to implement data restoration.

For example, the control chip 101 is configured to, in response to the unexpected power outage, send the data read command (for example, a DDR read command) to the memory cell connected thereto by the multiplexer 108, such that the memory cell sends data to a data signal line. In this way, the data flash memory chip connected to the memory cell reads the data from the data signal line, and writes the read data to the non-volatile memory connected thereto.

The control chip 101 is configured to, in response to the power resumption, send the data write command (for example, a DDR write command) to the memory cell connected thereto by the multiplexer 108. In the case that the data flash memory chip sends data in the non-volatile memory connected thereto to the data signal line, the memory cell reads the data from the data signal line and writes the read data to the memory cell based on the data write command.

Therefore, in the memory module according to the above embodiment, the data signal and the control signal are separately managed by two chips; the control chip is responsible for outputting the control signal, and the data flash memory chip is responsible for processing data. In this way, data signals of the non-volatile memory and the memory cell are no longer transmitted over the control chip, which greatly reduces connection lines from the memory cell to the control chip and also reduces the size of the control chip, such that a larger area is provided for the memory cell, dense wiring in the central position is optimized, and a signal transmission speed is also improved.

In addition, in the memory module, the positions of the data flash memory chip and the memory cell connected thereto may be determined according to the arrangement position of the memory cell. In this way, the position close to a dual-inline-memory-modules (DIMM) slot may be reserved for the memory cell, and the data flash memory chip and the memory cell connected thereto may be disposed at a position distal from the DIMM slot. As such, the memory cells have a larger area, and may be arranged in two lines, such that the capacity of the memory module is increased.

The data flash memory chip and the control chip are connected by the SerDes bus, such that a higher speed is achieved, the quantity of signals is small, and good scalability is achieved.

The memory module according to this embodiment may employ the flow control technology, thereby achieving high bandwidth and low latency. In this way, a capacitance requirement on a super capacitor is lowered.

In the memory module according to this embodiment, each of the at least one data flash memory chip is connected to a plurality of memory cells, thereby achieving higher bandwidth and higher speed. In this way, the capacitance requirement on the super capacitor is lowered.

In another embodiment of the present application, an initialization process of the memory module 10 may be as follows.

The data flash memory chip and the control chip 101 are in a reset state.

The data flash memory chip and the control chip 101 quit from the reset state and start self-initialization. Control parameters are set, and simulation and I/O initialization are in a preparation state.

The control chip 101 is set in a write training state: The control chip 101 firstly instructs, by the bus between the control chip 101 and the data flash memory chip, the data flash memory chip to perform write training; a DDR controller on a host (HOST) side drives a DDR control signal to send a write command to the control chip 101; the control chip 101 instructs the data flash memory chip to prepare to receive data and sends a DDR read command to the memory cell; the memory cell sends data therein to a DDR data line based on the DDR read command; and the data flash memory chip fetches the data from the DDR data line and writes the data to a corresponding non-volatile memory.

Next, the control chip 101 is set by the HOST in a read training state: The control chip 101 firstly instructs, by the bus between the control chip 101 and the data flash memory chip, the data flash memory chip to perform read training. Upon receiving a train command from the control chip 101, the data flash memory chip reads data from the non-volatile memory and sends the data to the DDR signal line; and the memory cell reads the data from the DDR data line based on a DDR write command from the control chip 101, and writes the data to the memory cell.

Lastly, the HOST reads DDR memory data and makes a confirmation.

Subsequently, this process is repeated at a predetermined number of cycles. During this period, different internal parameters need to be set for the data flash memory chip. Upon acquiring the data, the HOST makes a comparison, and finally sets an optimal data parameter for the control chip 101; and the control chip 101 then notifies the optimal data parameter to the data flash memory chip by an internal bus.

In the event of an unexpected power outage of the memory module, a data backup process may be as follows.

The control chip 101 is configured to receive an unexpected power outage notification from a hardware device connected to the memory module 10, and determine that the unexpected power outage occurs according to the unexpected power outage notification. For example, the control chip 101 is configured to receive an unexpected power outage notification from hardware of the CPU 12, and determine that the unexpected power outage occurs according to the unexpected power outage notification. In this case, the memory module 10 needs to be power-supplied by the capacitor 11.

The control chip 101 is configured to send to each of the at least one data flash memory chip a data backup command for reading data from the memory cell connected to the data flash memory chip under power supply from the capacitor 11 in response to the unexpected power outage. For example, the control chip 101 sends to the first data flash memory chip 102 the data backup command for reading data from the memory cells 104 connected to the first data flash memory chip 102; and the control chip 101 sends to the second data flash memory chip 103 the data backup command for reading data from the memory cells 105 connected to the second data flash memory chip 103.

In another embodiment of the present application, the control chip 101 determines a flow control rate according to the number and performance of memory cells, and the number and processing capabilities of data flash memory chips. For example, the performance of the memory cell includes a minimum value and a maximum value of a data read/write rate. The processing capabilities of the data flash memory chip includes a minimum value and a maximum value a rate for processing a command or data. The flow control rate includes a rate of sending a control command by the control chip and/or a rate of processing a command and/or data by the data flash memory chip.

Each of the at least one data flash memory chip is configured to, in response to the unexpected power outage, read data from the memory cell connected thereto and write the read data to the at least one non-volatile memory connected thereto based on the data backup command under power supply from the capacitor 11. For example, with respect to the memory module in FIG. 2, the first data flash memory chip 102 is configured to, in response to the unexpected power outage, read data from the memory cells 104 connected thereto and write the read data to the first non-volatile memory 106 connected thereto based on the data backup command under power supply from the capacitor 11; and the second data flash memory chip 103 is configured to, in response to the unexpected power outage, read the data from the memory cells 105 connected thereto and write the read data to the first non-volatile memory 106 connected thereto based on the data backup command under power supply from the capacitor 11. With respect to the memory module in FIG. 3, the second data flash memory chip 103 is configured to, in response to the unexpected power outage, read data from the memory cells 105 connected thereto and write the read data to the non-volatile memory 107 connected thereto based on the data backup command under power supply from the capacitor 11.

For example, in response to the unexpected power outage, the control chip 101 sends the data backup command to each of the at least one data flash memory chip (for example, the first data flash memory chip 102 and the second data flash memory chip 103); and the data flash memory chip determines whether the non-volatile memory connected thereto is capable of storing data, for example, determining whether the non-volatile memory connected thereto fails. In the case that the non-volatile memory does not fail, the data flash memory chip determines that the non-volatile memory is capable of storing data, or the data flash memory chip determines whether a remaining capacity of the non-volatile memory connected thereto is greater than or equal to a predetermined threshold. The data flash memory chip determines that the non-volatile memory is capable of storing data in the case that the remaining capacity of the non-volatile memory is greater than the predetermined threshold. In response to determining that the non-volatile memory connected to the data flash memory chip is capable of storing data, the data flash memory chip sends a backup preparation complete message to the control chip 101. The control chip 101 sends a DDR read command to the memory cell connected to the data flash memory chip. The memory cell sends data therein to the data signal line. The data flash memory chip fetches the data in the memory cell from the data signal line, and writes the data to the non-volatile memory that is connected thereto and capable of storing data.

For example, using the first data flash memory chip 102 as an example, in response to the unexpected power outage, the control chip 101 sends the data backup command to the first data flash memory chip 102; the first data flash memory chip 102 determines whether the non-volatile memory 106 connected thereto is capable of storing data, for example, determining whether the non-volatile memory 106 connected thereto fails. In the case that the non-volatile memory 106 does not fail, the first data flash memory chip 102 determines that the non-volatile memory 106 is capable of storing data, or the first data flash memory chip 102 determines whether a remaining capacity of the non-volatile memory 106 connected thereto is greater than or equal to a predetermined threshold. The first data flash memory chip 102 determines that the non-volatile memory 106 is capable of storing data in the case that the remaining capacity of the non-volatile memory 106 is greater than the predetermined threshold. In response to determining that the non-volatile memory 106 connected to the first data flash memory chip 102 is capable of storing data, the first data flash memory chip 102 sends the backup preparation complete message to the control chip 101. The control chip 101 sends, by the multiplexer 108, the DDR read command to the memory cells 104 connected to the first data flash memory chip 102. The memory cells 104 send data therein to the data signal line. The first data flash memory chip 102 fetches the data in the memory cells 104 from the data signal line, and writes the data to the non-volatile memory 106 that is connected thereto and capable of storing data.

For example, the control chip 101 further includes a sending unit and a command queue processing unit. The sending unit is configured to send a write command to a command queue in a specific sequence. The command queue processing unit is configured to generate a flash memory write command based on the write command, and send the flash memory write command to each of the at least one data flash memory chip by an internal bus (for example, the SerDes bus), wherein the flash memory write command is configured to instruct to perform data backup.

Each of the at least one data flash memory chip includes a receiving unit, a sending unit, a data fetching unit, a storage unit, and a flash memory controller that are connected.

The receiving unit of the data flash memory chip is configured to, upon receiving the flash memory write command, place the flash memory write command to the command queue; and the sending unit of the data flash memory chip is configured to returns a preparation complete message to the control chip 101 by the internal bus, wherein the preparation complete message is configured to indicate that the data flash memory chip has made preparations for subsequent operations.

The control chip 101 is configured to, upon receiving the preparation complete message, send the data backup command to the data flash memory chip and send the DDR read command to the memory cell connected to the data flash memory chip.

The memory cell sends data therein to the data signal line based on the DDR read command.

The receiving unit is further configured to receive the data backup command; the data fetching unit is configured to fetch, based on the data backup command, the data from the memory cell connected to the data flash memory chip, that is, fetching data from the data signal line and storing the data to the storage unit; the storage unit is configured to store the data fetched from the data signal line, and send the fetched data to the flash memory controller; the sending unit is further configured to send a fetch complete message to the control chip 101; and the flash memory controller is configured to write the fetched data to the non-volatile memory connected to the data flash memory chip. For example, the non-volatile memory is a flash memory.

In another embodiment of the present application, data in each of the at least two memory cells is stored to a corresponding position in the non-volatile memory. For example, the data flash memory chip stores the data in each of the memory cells connected thereto to a fixed position of the memory cell in the non-volatile memory. For example, in the case that 1, 2, 3, . . . , k memory cells are configured, 232 storage positions are present in the non-volatile memory, and each of the memory cells has a corresponding fixed storage position in the non-volatile memory. The specific physical addresses are managed in a mapping table, which are not described herein any further.

In another embodiment of the present application, the position of the non-volatile memory, to which the data of each of the memory cells is stored, is identified and determined by an address of the memory cell or a serial number of a pin of the data flash memory chip. For example, the first data flash memory chip 102 is connected to four memory cells 104, and in the case that the first data flash memory chip 102 stores the data in each of the four memory cells 104 to the non-volatile memory 106, the storage position of the data corresponds to the serial number of the pin of the first data flash memory chip 102.

In response to the power resumption, the HOST sends a command to the control chip 101. The control chip 101 sends the data restore command to each of the at least one data flash memory chip and sends the DDR write command to each of the memory cells. For example, the control chip 101 is configured to send the data restore command to the first data flash memory chip 102 and the second data flash memory chip 103, and send the DDR write command to the memory cells 104 connected to the first data flash memory chip 102 and the memory cells 105 connected to the second data flash memory chip 103.

Each of the at least one data flash memory chip is further configured to, in response to the power resumption, read data from the non-volatile memory connected thereto and write the read data to the memory cells connected thereto based on the data restore command.

For example, with respect to the memory module in FIG. 2, the first data flash memory chip 102 is configured to, in response to the power resumption, read data from the first non-volatile memory 106 and write the read data to the memory cells 104 connected thereto based on the data restore command; and the second data flash memory chip 103 is configured to, in response to the power resumption, read data from the first non-volatile memory 106 and write the read data to the memory cells 105 connected thereto based on the data restore command. With respect to the memory module in FIG. 3, the first data flash memory chip 102 is configured to, in response to the power resumption, read data from the first non-volatile memory 106 and write the read data to the memory cells 104 connected thereto based on the data restore command; and the second data flash memory chip 103 is configured to, in response to the power resumption, read data from the second non-volatile memory 107 and write the read data to the memory cells 105 connected thereto based on the data restore command.

The sending module of the control chip 101 sends a flash memory read command to each of the at least one data flash memory chip by the internal bus, wherein the flash memory read command is configured to instruct to perform data restoration.

The receiving unit of the data flash memory chip is configured to, upon receiving the data flash memory read command, place the data flash memory read command to a command queue thereof, and send the command queue.

The flash memory controller of the data flash memory chip determines, based on the flash memory read command, whether the non-volatile memory connected thereto has prepared for data restoration, for example, determining whether the non-volatile memory fails. In the case that the non-volatile memory does not fail, the flash memory controller determines that the non-volatile memory has prepared for data restoration. For example, the non-volatile memory may be a flash memory.

In response to determining that the non-volatile memory has prepared for data restoration, the data flash memory chip sends a data restoration preparation complete message to the control chip 101.

In response to receiving the data restoration preparation complete message, the control chip 101 sends, by the multiplexer 108, the DDR write command to the memory cell connected to the data flash memory chip.

The data flash memory chip acquires data from the non-volatile memory connected thereto and sends the acquired data to the data signal line based on the data restore command.

The memory cell connected to the data flash memory chip acquires data from the data signal line based on the DDR write command and writes the acquired data to the memory cell. For example, the memory cell writes the acquired data to an internal memory unit thereof.

The data flash memory chip sends a data restore complete message to the control chip 101.

Since each of the memory cells has a corresponding storage position, for example, a fixed position, in the non-volatile memory, in the event of power resumption, the data flash memory chip is capable of writing the data stored in the non-volatile memory to the corresponding memory cell in the case of the unexpected power outage. That is, the data in the memory cell is restored.

Therefore, in the memory module according to the above embodiment, each of the memory cells is no longer connected to a control chip, and instead, the command and the data are separated by the control chip and the data flash memory chip. Therefore, the connection lines from the memory cells and the control chip may be greatly reduced, and further the size of the control chip is also reduced. In this way, the memory cells have a larger area, dense wiring at the central position is addressed, and the signal quality is also improved. Therefore, the capacity of the memory module may be greatly improved, and the signal transmission rate is not affected by the length of the connection line.

Figure 4:
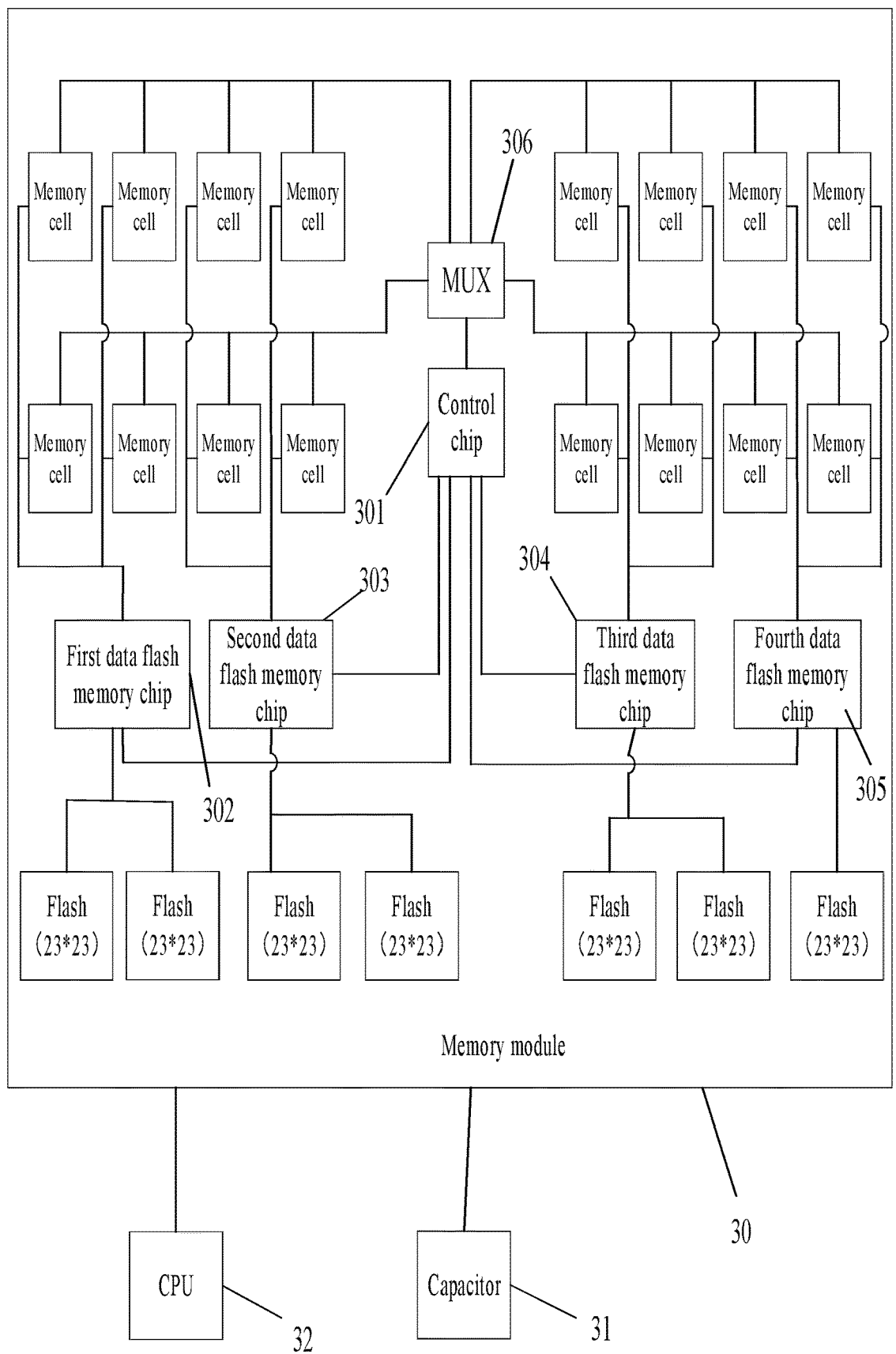
FIG. 4 is a schematic structural diagram of still another memory module according to another embodiment of the present application.

As illustrated in FIG. 4, a schematic structural view of a memory module 30 according to an embodiment of the present application is given. The memory module 30 may be connected to a capacitor 31 and a CPU 32. The capacitor 31 is configured to supply power to the memory module 30 in response to a power outage. For example, in response to an unexpected power outage, the memory module 30 may still operate for a period of time under power supply by the capacitor 31. This period of time is determined depending on a capacity of the capacitor 31. In response to a power resumption, the capacitor 31 may be charged by a power source.

The memory module 30 may be a non-volatile memory (NVDIMM-N).

The memory module 30 includes: a control chip 301, at least two data flash memory chips, at least one multiplexer (MUX) 306, at least two memory cells, and at least two non-volatile memories; wherein each of the at least two data flash memory chips is connected to at least two of the at least two memory cells and at least one of the at least two non-volatile memory, and the control chip 301 is connected to each of the at least two data flash memory chips. For example, the control chip 301 is connected to the each of the at least two data flash memory chips by a SerDes bus, and the control chip 301 is further connected to the at least two memory cells by a multiplexer (MUX) 306.

For example, the at least two data flash memory chips include: a first data flash memory chip 302, a second data flash memory chip 303, a third data flash memory chip 304, and a fourth data flash memory chip 305; and the non-volatile memory includes a plurality of flash memories.

The control chip 301 is connected to the first data flash memory chip 302, the second data flash memory chip 303, the third data flash memory chip 304, and the fourth data flash memory chip 305 by the SerDes bus. The control chip 301 further includes a control pin. The control chip 301 is connected to the multiplexer 306 by the control pin. The multiplexer 306 is connected to each of the at least two memory cells. For example, the multiplexer 306 is connected to the at least two memory cells.

The first data flash memory chip 302, the second data flash memory chip 303, and the third data flash memory chip 304 are all connected to at least two of the at least two memory cells and at least one flash memory; and the fourth data flash memory chip 305 is connected to at least two of the at least two memory cells and at least one flash memory.

Each MUX is connected to at least two of the at least two memory cells, and the control chip 301 is connected to the memory cells by the MUX, wherein the number of memory cells connected to each MUX may be predetermined.

In another embodiment of the present application, the memory cells may be RDIM cells or SDRAM cells, which are not limited in this embodiment.

In another embodiment of the present application, the non-volatile memory may also be referred to as a flash memory, at least one non-volatile memory may be provided, and each of the at least one data flash memory chip is further connected to at least one of the at least one non-volatile memory. In another embodiment of the present application, each of the at least one non-volatile memory includes non-volatile memory units in a matrix configuration, for example, 2, 4, . . . , n non-volatile memory units, wherein n is greater than or equal to a power of 2, for example, n=8.

In another embodiment of the present application, a storage capacity of each of the at least one non-volatile memory is greater than a storage capacity of all the memory cells connected to the data flash memory chip that is connected to the non-volatile memory. For example, the storage capacity of each of the at least one non-volatile memory is 1.5, 2, 3, 4, or 5 times the storage capacity of all the memory cells connected to the data flash memory chip that is connected to the non-volatile memory.

The control chip 301 is configured to receive an unexpected power outage notification from a hardware device connected to the memory module 30, and determine that the unexpected power outage occurs according to the unexpected power outage notification. For example, the control chip 301 is configured to receive an unexpected power outage notification from hardware of the CPU 32, and determine that the unexpected power outage occurs according to the unexpected power outage notification. In this case, the memory module 30 needs to be power-supplied by the capacitor 31.

The control chip 301 is configured to, in response to the unexpected power outage, send to each of the at least two data flash memory chips a data backup command for reading data in the memory cells connected to the data flash memory chip, and send a data read command for reading data to each of the memory cells connected to the data flash memory chip under power supply from the capacitor 31. For example, the control chip 301 sends a data backup command to the first data flash memory chip 302, the second data flash memory chip 303, the third data flash memory chip 304, and the fourth data flash memory chip 305. In another embodiment of the present application, the control chip 301 sends the data backup command according to a flow control rate. For example, the control chip 301 determines the flow control rate according to the number and performance of the memory cells, and the number and processing capabilities of the data flash memory chips.

Each of the at least two memory cells is configured to sends data therein to a data signal line, for example, a DDR data line, based on the data read command (for example, a DDR read command).

Each of the at least one data flash memory chip is configured to, in response to the unexpected power outage, read data from the memory cell connected thereto and write the read data to at least one of the at least two non-volatile memories connected thereto based on the data backup command under power supply from the capacitor 31, that is, fetching data from the data signal line and writing the fetched data to the at least one of the at least two non-volatile memory connected thereto. For example, the first data flash memory chip 302, the second data flash memory chip 303, and/or the third data flash memory chip 304 are configured to, in response to the unexpected power outage, fetches data in the at least two memory cells connected thereto from the data signal line and write the fetched data to the at least two flash memories connected thereto based on the data backup command under power supply from the capacitor 31. For example, the fourth data flash memory chip 305 is configured to, in response to the unexpected power outage, read data in the at least two memory cells connected thereto from the data signal line and write the fetched data to the at least one flash memory connected thereto based on the data backup command under power supply from the capacitor 31.

In another embodiment of the present application, data in each of the at least two memory cells is stored to a corresponding position in the non-volatile memory. For example, the data flash memory chip stores the data in each of the memory cells connected thereto to a fixed position of the memory cell in the non-volatile memory. For example, in the case that 1, 2, 3, . . . , k memory cells are configured, 232 storage positions are present in the non-volatile memory, and each of the memory cells has a corresponding fixed storage position in the non-volatile memory. For example, the 1st to 32nd bits of the non-volatile memory are configured to store the data in the first memory cell, and the 33rd to 64th bits of the non-volatile memory are configured to store the data in the second memory cell, and the like, which are not described herein any further.

In another embodiment of the present application, the data flash memory chip stores the data in each of the memory cells connected thereto to a fixed position of the memory cell in the non-volatile memory for writing a data sequence. For example, data is typically written to the non-voltage memory in the form of a data sequence, the 1st to 32nd bits of the data sequence written to the non-volatile memory are configured to write the data to the first memory cell, and the 33rd to 64th bits of the data sequence written to the non-volatile memory are configured to write the data in the second memory cell, and the like, which are not described herein any further.

In another embodiment of the present application, the position of the non-volatile memory, to which the data of each of the memory cells is stored, is identified and determined by an address of the memory cell or a serial number of the data flash memory chip. For example, the first data flash memory chip 302 is connected to four memory cells 304, and in the case that the first data flash memory chip 302 stores the data in each of the four memory cells 304 to a flash memory, the storage position of the data corresponds to the serial number of the first data flash memory chip 302.

In response to the power resumption, the control chip 301 is further configured to a data restore command to each of the at least two data flash memory chips and sends a data write command (for example, a DDR write command) to each of the memory cells. For example, the control chip 301 sends the data restore command to the first data flash memory chip 302, the second data flash memory chip 303, the third data flash memory chip 304, and the fourth data flash memory chip 305.

Each of the at least two data flash memory chips is further configured to, in response to the power resumption, read data from the non-volatile memory connected thereto and send the data to the data signal line based on the data restore command; and the memory cell reads the data from the data signal line and writes the read data thereto based on the data write command. For example, the first data flash memory chip 302, the second data flash memory chip 303, and/or the third data flash memory chip 304 are configured to, in response to the power resumption, read data from at least two flash memories connected thereto and send the read data to the data signal line based on the data restore command;

and the memory cells connected to these data flash memory chips read the data from the data signal line and write the read data thereto based on the data write command. For example, the fourth data flash memory chip 305 is configured to, in response to the power resumption, read data from at least one flash memory connected thereto and send the read data to the data signal line based on the data restore command; and the memory cells connected to the fourth data flash memory chip 305 read the data from the data signal line and write the read data thereto based on the data write command.

Since each of the memory cells has a corresponding storage position, for example, a fixed position, in the non-volatile memory (for example, a flash memory), in the event of power resumption, the data flash memory chip is capable of writing the data stored in the non-volatile memory to the corresponding memory cell in the case of the unexpected power outage. That is, the data in the memory cell is restored.

Therefore, in the memory module according to the above embodiment, each of the memory cells is no longer connected to a control chip, and instead, the command and the data shared between the control chip and the data flash memory chip. Therefore, the connection lines from the memory cells and the control chip may be greatly reduced, and further the size of the control chip is also reduced. In this way, the memory cells have a larger area, dense wiring at the central position is addressed, and the signal quality is also improved. Therefore, the capacity of the memory module may be greatly improved, and the signal transmission rate is not affected by the length of the connection line.

Further, the data signal and the control signal are managed separately by two chips. The control chip is responsible for outputting a control command, for example, a DDR command, an address signal, a clock signal, and the like DDR signals. The data flash memory chip is responsible for DDR data processing, for example, fetching data in the event of the unexpected power outage, and restoring data in the event of the power resumption, such that the data signal rate is improved.

Further, the control chip and the data flash memory chip communicate with each other by the SerDes bus, such that the communication speed is increased, and the number of signals is small and good scalability is achieved In the above embodiments, the flow control technology is employed, thereby achieving high bandwidth and low latency. In this way, a capacitance requirement on the capacitor is lowered.

In several embodiments provided in the present application, it should be understood that the disclosed system, device and method may be implemented in other manners. The above described device embodiments are merely illustrative. For example, the modules or units are merely defined in terms logical functionality, and may be defined in other fashions in practice. For example, a plurality of units or components may be combined or integrated into another device, or some features may be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate components may be physically separated or may be not physically separated, and the components which are illustrated as units may be or may not be physical units, that is, the components may be located in the same position or may be distributed into a plurality of network units. Some or all of the units may be selected according to actual needs to achieve the objectives of the solutions of the embodiments.

In addition, functional units in the embodiments of the present application may be integrated into one processing unit, or each of the units may exist along physically, or at least two units may be integrated into one unit. The integrated units above may be implemented in a form of hardware or in a form of a software functional unit.

Where the integrated units are implemented in a form of a software functional unit and sold or used as an independent product, the units may be stored in a computer readable storage medium. Based on such an understanding, the technical solutions of the present application essentially, or the part contributing to the related art, or all or part of the technical solutions may be implemented in a form of a software product. The computer software product is stored in a storage medium and includes several instructions to cause a computer device (which may be a personal computer, a server, a network device, or the like) or a processor to perform all or some of steps of the methods described in the embodiments of the present application. The storage medium includes various media capable of storing program code, for example, a USB flash disk, a removable hard disk, a read-only memory (ROM), a random-access memory (RAM), a magnetic disk, or an optical disc.

In summary, it should be finally noted that the above-described embodiments are merely for illustration of the present application, but are not intended to limit the present application. Although the present application is described in detail with reference to these embodiments, a person skilled in the art may also make various modifications to the technical solutions disclosed in the embodiments, or make equivalent replacements to a part of the technical features contained therein. Such modifications or replacements, made without departing from the principles of the present application, shall fall within the scope of the present application.

What is claimed is:
1. A memory module, comprising:
a control chip;
at least one data flash memory controller;
at least two memory cells; and
at least one non-volatile memory,
wherein each of the at least one data flash memory controller is connected to at least one of the at least two memory cells and at least one of the at least one non-volatile memory respectively,
the control chip is connected to all the at least one data flash memory controller and all the at least two memory cells respectively, and
the memory module is further connected to at least one capacitor,
wherein the control chip is configured to send a control command; and
each of the at least one data flash memory controller is configured to transmit, based on the control command from the control chip, data between a memory cell connected thereto and a non-volatile memory connected thereto, so that the transmitted data and the control command are separately managed by each of the at least one data flash memory controller and the control chip respectively, and data transmitted between of the non-volatile memory and all the at least two memory cells are not transmitted over the control chip;

wherein, in response to an unexpected power outage, each of the at least one data flash memory controller is configured to back up, based on a data backup command included in the control command from the control chip, data in a memory cell connected thereto to a corresponding non-volatile memory connected thereto to implement data backup; and in response to a power resumption, each of the at least one data flash memory controller is configured to restore, based on a data restore command included in the control command from the control chip, data in a non-volatile memory connected thereto to a corresponding memory cell connected thereto to implement data restoration.

2. The memory module according to claim 1, wherein the control command further comprises a data read command, wherein the control chip is configured to send the data backup command to each of the at least one data flash memory controller and send the data read command to each of the at least two memory cells under power supply from the capacitor in response to the unexpected power outage, each of the at least two memory cells is configured to send the data stored therein to a data signal line based on the data read command under power supply from the capacitor, and each of the at least one data flash memory controller is configured to acquire, based on the data backup command, the data sent from the memory cell connected thereto from the data signal line and write the acquired data to at least one of the at least one non-volatile memory connected thereto under power supply from the capacitor.

3. The memory module according to claim 2, wherein each of the at least one data flash memory controller is further configured to:

before the sending of the data read command by the control chip, determine whether the non-volatile memory connected thereto is capable of storing data; and send a backup preparation complete message to the control chip in the case that the data flash memory controller determines that the non-volatile memory connected thereto is capable of storing data.

4. The memory module according to claim 3, wherein each of the at least one data flash memory controller is further configured to: determine whether the non-volatile memory connected thereto fails, and determine that the non-volatile memory is capable of storing data in the case that the non-volatile memory does not fail; or each of the at least one data flash memory controller is further configured to determine whether a remaining capacity of the non-volatile memory connected thereto is greater than or equal to a predetermined threshold, and determine that the non-volatile memory is capable of storing data in the case that the remaining capacity of the non-volatile memory is greater than the predetermined threshold.

5. The memory module according to claim 2, wherein the control chip is further configured to:

receive an unexpected power outage notification from a central processing unit (CPU); and determine that the unexpected power outage occurs according to the unexpected power outage notification.

6. The memory module according to claim 1, wherein the control command further comprises a data write command, wherein the control chip is configured to send the data restore command to each of the at least one data flash memory controller and send the data write command to each of the at least two memory cells in response to the power resumption, each of the at least one data flash memory controller is further configured to, in response to the power resumption, read data from the non-volatile memory connected thereto and send the data read from the non-volatile memory to a data signal line based on the data restore command, and each of the at least two memory cells is configured to acquire data sent by the data flash memory controller connected thereto from the data signal line based on the data write command in response to the power resumption, and write the acquired data to itself.

7. The memory module according to claim 1, wherein each of the at least one data flash memory controller is further configured to:

before the sending of the data write command by the control chip to each of the at least two memory cells, determine whether the non-volatile memory connected thereto has prepared for data restoration; and send a data restoration preparation complete message to the control chip in that case that the non-volatile memory connected thereto has prepared for data restoration.

8. The memory module according to claim 1, wherein the control chip comprises at least one control pin, and the memory module further comprises at least one multiplexer, wherein the at least one control pin are connected to the at least two memory cells by the at least one multiplexer.

9. The memory module according to claim 1, wherein
data of each of the at least two memory cells is stored to a corresponding position in the at least one non-volatile memory; or
data of each of the at least two memory cells is stored to a fixed position of a data sequence in the at least one non-volatile memory.

10. The memory module according to claim 1,
wherein the control chip is further configured to:
determine a flow control rate according to a quantity and performance of the memory cells, and a quantity and processing capabilities of the data flash memory controllers.

11. The memory module according to claim 1, wherein a storage capacity of each of the at least one non-volatile memory is greater than a storage capacity of all the memory cells connected to a data flash memory controller connected thereto.

12. The memory module according to claim 11, wherein the storage capacity of each of the at least one non-volatile memory is 1.5, 2, 3, 4, or 5 times the storage capacity of all the memory cells connected to the data flash memory controller that is connected to the non-volatile memory.

13. The memory module according to claim 1, wherein the control chip is connected to each of the at least one data flash memory controller by a Serializer/Deserializer bus.

14. The memory module according to claim 1, wherein different data flash memory controllers are connected to different memory cells respectively.

15. The memory module according to claim 1, wherein
when the at least one non-volatile memory comprises only one non-volatile memory, the at least one data flash memory controller are connected to the non-volatile memory; or when the at least one non-volatile memory comprises at least two non-volatile memories, different data flash memory controllers are connected to different non-volatile memories respectively.

16. The memory module according to claim 1, wherein the at least one data flash memory controller comprises a first data flash memory controller and a second data flash memory controller, a part of the at least two memory cells is connected to the first data flash memory controller, and the remaining part of the at least two memory cells is connected to the second data flash memory controller.

17. The memory module according to claim 16, wherein the at least one non-volatile memory comprises a non-volatile memory, and the non-volatile memory is connected to the first data flash memory controller and the second data flash memory controller; or the at least one non-volatile memory comprises a first non-volatile memory and a second non-volatile memory, the first data flash memory controller is connected to the first non-volatile memory, and the second data flash memory controller is connected to the second non-volatile memory.

18. The memory module according to claim 1, wherein the at least one data flash memory controller comprises a first data flash memory controller, a second data flash memory controller, a third data flash memory controller and a fourth data flash memory controller, and the first data flash memory controller, the second data flash memory controller, the third data flash memory controller and the fourth data flash memory controller are connected to different non-volatile memories respectively.

19. A computer, comprising the memory module as defined in claim 1.

20. A server, comprising the memory module as defined in claim 1.

* * * * *